United States Patent

Vincent et al.

[11] Patent Number: 5,633,973
[45] Date of Patent: May 27, 1997

[54] SPLICE BOX FOR SPLICING TOGETHER OPTICL-FIBER CABLES

[75] Inventors: Alain Vincent, Juilly; Michel Milanowski, Anserville, both of France

[73] Assignee: Alcatel Cable Interface, Vrigne Aux Bois, France

[21] Appl. No.: 568,683

[22] Filed: Dec. 7, 1995

[30] Foreign Application Priority Data

Dec. 8, 1994 [FR] France ................... 94 14775

[51] Int. Cl.$^6$ ........................................ G02B 6/00
[52] U.S. Cl. ................. 385/135; 385/134; 385/136
[58] Field of Search ..................... 385/134, 135, 385/136, 137

[56] References Cited

U.S. PATENT DOCUMENTS

| | | | |
|---|---|---|---|
| 4,679,896 | 7/1987 | Krafcik et al. | 385/135 X |
| 4,805,979 | 2/1989 | Bossard et al. | 385/135 X |
| 5,093,886 | 3/1992 | Smoker et al. | 385/135 |
| 5,218,664 | 6/1993 | O'Neill et al. | 385/135 |
| 5,224,199 | 6/1993 | Cortijo | 385/135 |
| 5,323,480 | 6/1994 | Mullaney et al. | 385/135 |
| 5,446,823 | 8/1995 | Bingham et al. | 385/135 |

FOREIGN PATENT DOCUMENTS

| | | | |
|---|---|---|---|
| 0397587A1 | 11/1990 | European Pat. Off. | 385/135 X |
| 0589618A1 | 3/1994 | European Pat. Off. | 385/135 X |
| 0637767A2 | 2/1995 | European Pat. Off. | 385/135 X |
| 2682775 | 4/1993 | France | 385/135 X |
| 2151041 | 7/1985 | United Kingdom | 385/135 X |

*Primary Examiner*—Brian Healy
*Attorney, Agent, or Firm*—Sughrue, Mion, Zinn, Macpeak & Seas

[57] ABSTRACT

A splice box for splicing together optical-fiber cables includes a box body provided with side accesses for the cables, and fastening base-plates for fastening said cables, the base-plates being removably fixed to a support inside the body. Each access serves to receive a plurality of cables that are held stationary on their respective base-plates, and said base-plates are superposable inside the box body and facing a common access.

11 Claims, 3 Drawing Sheets

SPLICE BOX FOR SPLICING TOGETHER OPTICL-FIBER CABLES

The present invention relates to a splice box for splicing together optical-fiber cables, inside which box the cables are held stationary with their fibers released and made accessible so that they can be interconnected.

BACKGROUND OF THE INVENTION

Document FR-A-2 682 775 discloses a device for fastening a cable. Outside the splice box, the cable is fastened to the device so that it is held stationary thereon. The device is then removably fixed inside the splice box.

That device is constituted by a removable base-plate having a rear plane portion on which the cable in the non-stripped state is received and held stationary, and a front plane portion on which and from the front end of which surplus lengths of the fibers extend freely from the cable in the stripped state. A cradle in the form of a rectangular block provided with a semi-cylindrical groove interconnects the rear plane portion and the front plane portion, and receives the cable in the stripped state. A centering stud under the cradle, and a hole in the front portion of the base-plate enable the base-plate to be positioned and fixed inside the splice box on a base or a tray referred to as an "internal support" by means of a screw. A plurality of base-plates may be fixed to the internal tray along two opposite side walls of the splice box which is rectangular in overall shape. Locations for the base-plates are provided on the support, and each location is defined by a pair of holes respectively receiving the centering stud of the corresponding base-plate, and the screw for fixing it. Corresponding accesses are provided on the relevant opposite side walls of the splice box for the cables which are fastened to their respective base-plates so as to be held stationary thereon prior to fixing the base-plates inside the splice box.

The maximum capacity of the splice box is reached once every one of the locations provided for the base-plates along the two opposite side walls is occupied by a base-plate.

OBJECT AND BRIEF SUMMARY OF THE INVENTION

An object of the invention is to increase the capacity of the splice box without changing the dimensions of the internal support to which the base-plates for holding stationary the individual cables are fixed, the increase in capacity being achieved by making it possible to mount base-plates on the internal support in a more compact manner.

The present invention provides a splice box for splicing together optical-fiber cables, the splice box including a box body provided with side accesses for said cables, fastening base-plates for fastening the individual cables, and means for coiling the fibers from said cables and for holding splice connections between said fibers, each of said fastening base-plates being removably fixed to a support inside the box body, once one of said cables is held stationary on the base-plate, with the fibers from the cable having free surplus lengths on a "front" end of said base-plate, wherein each access to said box body serves to make it possible to receive a plurality of cables that are already held stationary on their respective fastening base-plates, and said base-plates include means for superposing them at least in part on top of one another inside the box body and facing a common access receiving a plurality of cables, and they are fixed in the superposed state to said support.

Advantageously, the splice box further has at least one of the following additional characteristics:

said support is provided with a set of holes situated facing each access and assigned for removably fixing a plurality of fastening base-plates;

said splice box includes guiding and sealing means for guiding and sealing each cable in each access, which means comprise at least one relatively rigid ring for guiding each cable through the access, a deformable sealing ring, and an outside clamping nut for clamping said rings in the access and around each cable;

the right cross-section of said base-plate is a channel section, over at least a "front" half of its length; and said base-plate includes a plane web having a first width over said front half and a second width that is perceptibly smaller than the first width over the rear other half, and a front end block that is integral with said web, that projects axially therefrom, and that is provided with a hole extending over its height for fixing said base-plate by means of a screw.

BRIEF DESCRIPTION OF THE DRAWINGS

The characteristics and advantages of the present invention appear from the following description of an embodiment given by way of example and with reference to the accompanying drawings, in which.

MORE DETAILED DESCRIPTION

Figure 1:
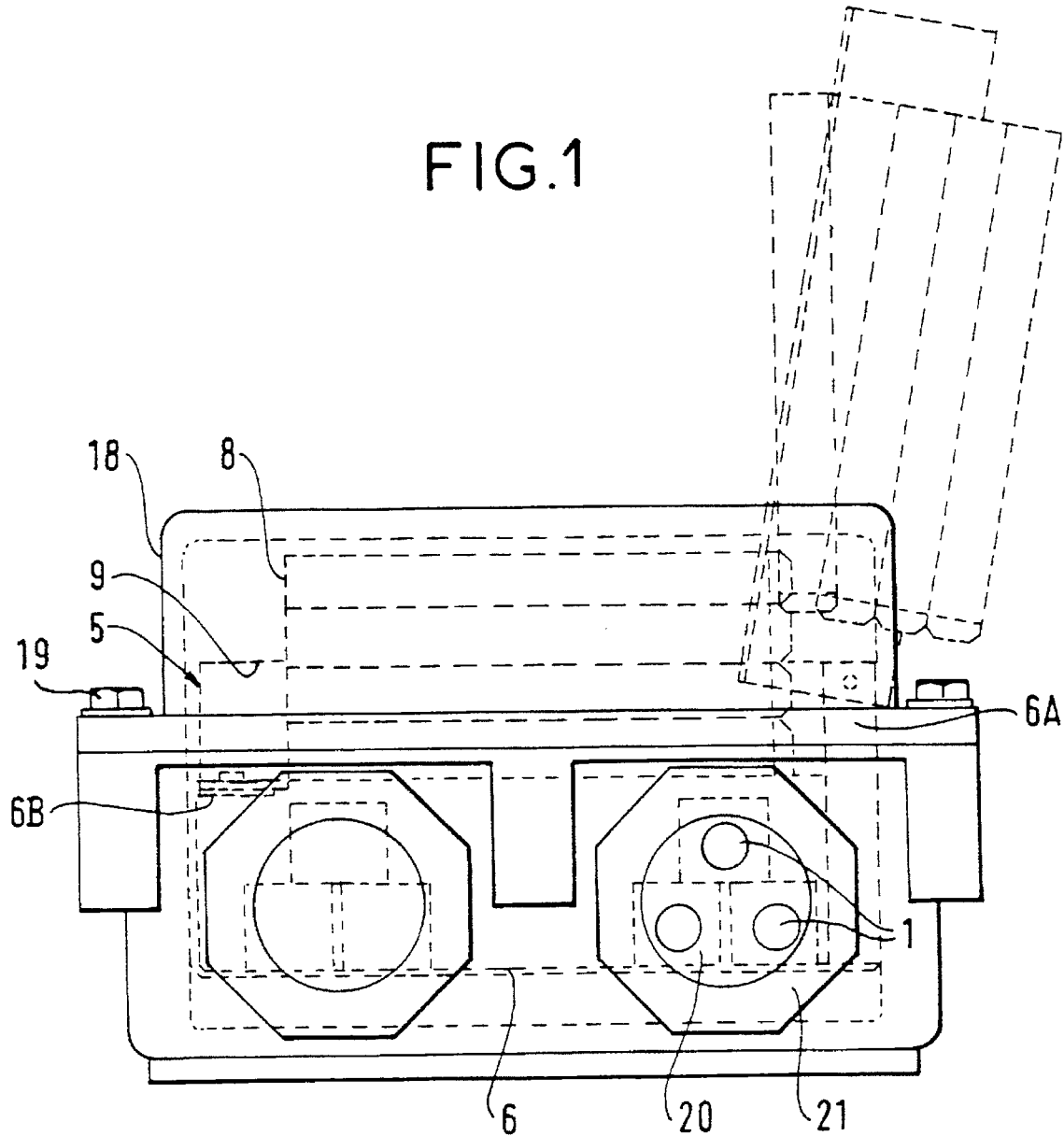
FIG. 1 is an end view of a splice box of the invention.
Figure 2:
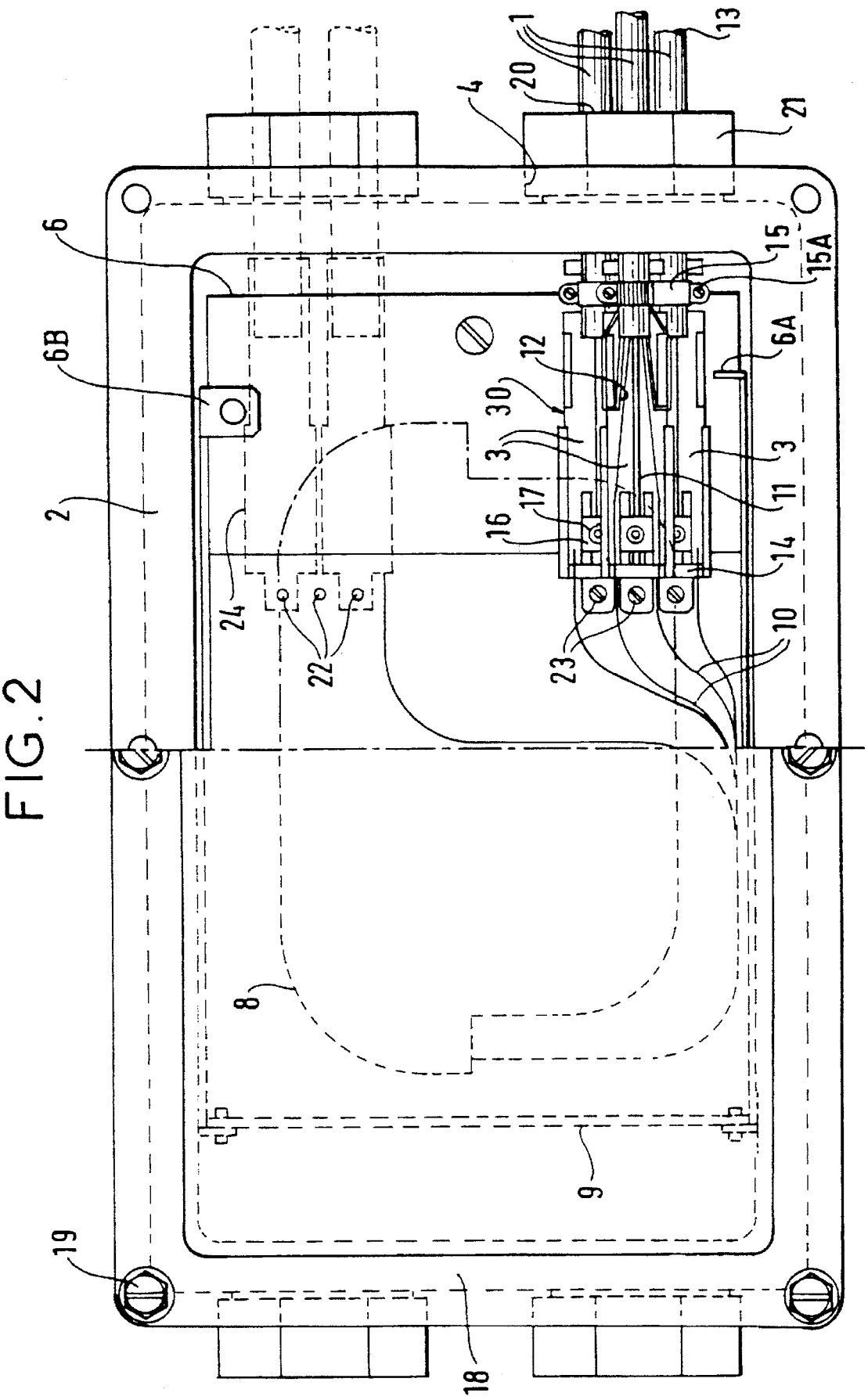
FIG. 2 is a plan view of the splice box shown closed in a portion of the figure and open and partially equipped in the other portion of FIG. 2.

FIGS. 1 and 2 show a splice box for splicing together cables 1 containing optical fibers 10, the splice box including a box body 2 inside which removable fastening base-plates 3 for fastening the cables are fixed. Each cable is fastened so that it is held stationary on a respective one of the base-plates before the base-plate is fixed inside the box body.

The box body is provided with cylindrical accesses 4 in its small side walls for receiving cables that are already prepared and held stationary on their base-plates. The top face of the body is open, and a fiber splice organizer assembly 5 is installed via the open top face.

As shown, in this embodiment the base-plates 3 are removably fixed to a support 6 itself fixed at the bottom of the box housing. The support is provided with two hinge brackets 6A and two abutment brackets 6B projecting relative to the support 6 substantially over the height of the box body. The organizer assembly 5 comprises cassettes 8 that are stackable on top of one another and that are hinged to one another substantially along one of their edges. The cassettes are carried by a channel-section tray 9 hinged to the two brackets 6A and received in abutment against the two brackets 6B. The tray 9 extends above the fastening base-plates as installed inside the box body. The tray 9 opens about the hinge axis defined by the two brackets 6A to give access to the bottom portion of the box body so as to make it possible to install the base-plates or to take action on the installed base-plates.

As shown in FIG. 2, each optical-fiber cable comprises a central strength member 11, a plurality of optical fibers 10 around the strength member, peripheral reinforcing roving 12 around the fibers and an outer sheath 13. In general, the fibers are protected individually or in groups inside protective tubes (not shown), and/or they are installed in the grooves of a grooved rod (not shown either).

Each prepared cable is fastened to its fastening base-plate outside the box body before the base-plate is fixed therein. Fastening is achieved by holding stationary the cable in the non-stripped state on a rear portion of the base-plate by means of a collar 15 and of a side clamping screw 15A for clamping the collar around the cable. The cable is stripped just beyond the collar 15, surplus lengths of its fibers are allowed to extend freely over the front of the base-plate, and its reinforcing roving is stopped and locked under the collar. Its central strength member is itself stopped and locked on the front portion of the base-plate in a locking nut 16, or some other locking means receiving it, by means of a clamping screw 17.

The optical fibers 10 are received and guided through a foam pad 14 which is split and which is retained on the front portion of the base-plate.

Naturally the structure of each cable may be slightly different, and it may be fastened slightly differently.

The splice box further includes a cover 18 which covers the organizer assembly 5 and which is fixed by means of screws 19 to the periphery of the top face of the box body. A peripheral gasket (not shown) provides sealing between the box body and the cover.

According to the invention, each access 4 is organized to make it possible to receive a plurality of cables that are already held stationary on their individual base-plates 3, the base-plates being mutually identical and superposable on top of one another so that they can be fixed in the superposed state to the support 6 inside the splice box. Each access can receive a single cable if the cross-section of the cable is large, one or two cables if they are of medium cross-section, or from one to three or four cables if they are of small cross-section. Cables of large cross-section belong to a first defined range, those of medium cross-section belong to a second range, and those of small cross-section belong to a third range. The number of optical fibers depends on the cross-section of the cable in question.

A guiding and sealing assembly 20 holds in a sealed manner the cable(s) in the non-stripped state passing through each access. It is locked in the access and around the cable(s) by an external nut 21 through which the cable(s) also pass.

A set of tapped holes 22 is provided in the support 6 and facing each access for the purpose of fixing the fastening base-plates to the support, enough holes being provided for the maximum possible number of cables received in the access, and each hole 22 being assigned to fixing one base-plate or optionally two superposed base-plates. Fixing is achieved by means of a screw 23 received in one of the holes 22 via the front portion of the base-plate.

In FIG. 2, each set of holes 22 comprises three holes in line abreast with one another and all longitudinally in line with a corresponding one of the accesses, and makes it possible to fix a set 30 of three fastening base-plates for fastening three cables. Facing one of the accesses that is not yet equipped, two locations 24 are shown in dashed lines for two base-plates received substantially side-by-side on the support 6, which locations are defined by the two end holes in the set of holes 22. The third hole 22 between the two end holes defines either another location on the support for a single fastening base-plate fastening a cable of large cross-section, or a location on the support for two base-plates superposed one on top of the other and fixed by a "long" single screw received in the intermediate hole 22, or else a location relative to the support for a base-plate which is superposed on top of two base-plates already fixed by means of the two end holes 22, and which rests on the facing respective longitudinal edges of the two already-fixed base-plates.

In a variant (not shown), the set of holes serving to fix fastening base-plates may include two other holes just in front of the two above-mentioned end holes 22, for fixing four base-plates superposed in pairs, with the top base-plates projecting slightly relative to the front of the bottom base-plates.

Figure 3:
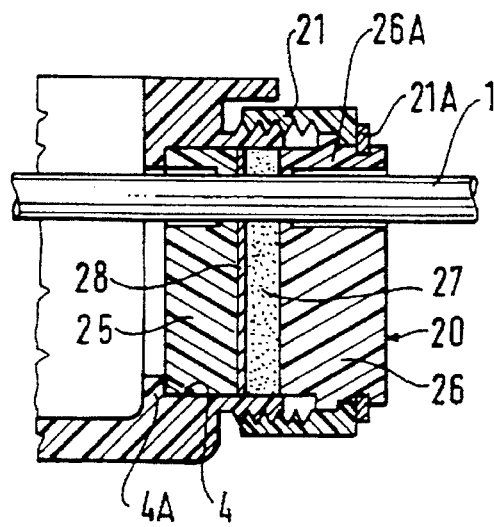
FIG. 3 is a section view of an equipped access of the splice box shown in FIG. 1.

FIG. 3 shows an embodiment of the guiding and sealing assembly 20 in the equipped access 4 shown in FIG. 2. The assembly includes a fixed guide ring 25 in the access 4 and in abutment against a front inside shoulder 4A of the access, a moving guide ring 26 which is mounted in the nut 21, and a sealing ring 27 interposed between the two guide rings. In this embodiment, the nut is free to rotate on the periphery of the moving ring 26, and it is locked longitudinally on the moving ring between an intermediate peripheral shoulder 26A on the ring, and a rear locking annular spring clip 21A.

The guide rings are relatively rigid. The sealing ring is deformable by compression, so that its material creeps out over the periphery of the assembly 20 and around the installed cables on tightening the nut. Advantageously, the sealing ring may be associated with a metal washer 28 interposed between it and the fixed guide ring. The metal washer prevents the sealing ring from adhering to it so that the sealing ring remains secured to the moving ring on loosening the nut after it has been tightened.

The rings 25 and 26 and the washer are provided with through passages for the individual cables that can be received in the access. They are chosen accordingly on installing the first cable in the access, the cross-section of the first cable determining whether or not other cables can be installed simultaneously or subsequently. It should be noted that when an access is initially under-equipped, i.e. it receives a single cable but it can receive at least one other, each non-used passage is closed off by means of a suitable plug.

The sealing ring is also provided with one or more through passages, depending on the number of cables passing through the access. Sealing rings having different numbers of passages are interchangeable. In order to equip an under-equipped access more fully, the initial sealing ring secured to the moving ring in the unscrewed nut is removed, and it is replaced with a new sealing ring. Each passage in the sealing ring is split to the periphery of the ring so that the ring can be installed.

It should be also be noted that, in order to equip an under-equipped access more fully, the nut 21 is unscrewed so that the sealing assembly can be withdrawn from the access and along the cables that are already held in the splice box. An additional cable is threaded through a non-used and opened-up passage in each of the guide rings. Outside the splice box, the cable is prepared and fastened so as to be held stationary on its own fastening base-plate, and the base-plate is then fixed inside the splice box. The holding and sealing assembly provided with a new sealing ring is then put back in place and clamped in the access.

Figure 4:
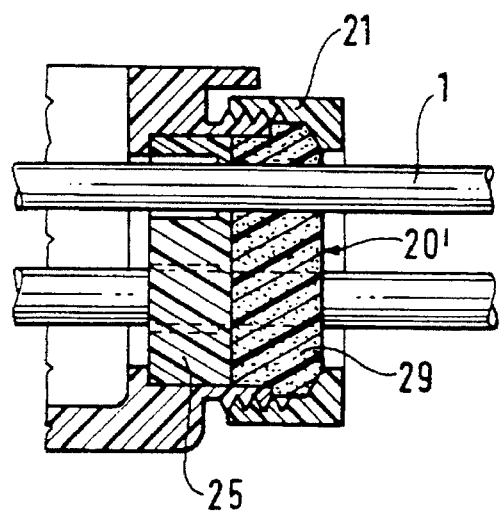
FIG. 4 is a section view corresponding to FIG. 3 and showing a variant on the extent to which the access is equipped.

FIG. 4 shows a variant embodiment of the holding and sealing assembly shown in FIG. 3. The assembly in FIG. 4 is referenced 20' and differs from the FIG. 3 assembly in that it has a sealing gasket 29 in the nut, which gasket serves the same purposes as the moving ring, the sealing ring, and the metal washer in the FIG. 3 assembly.

Figure 5:
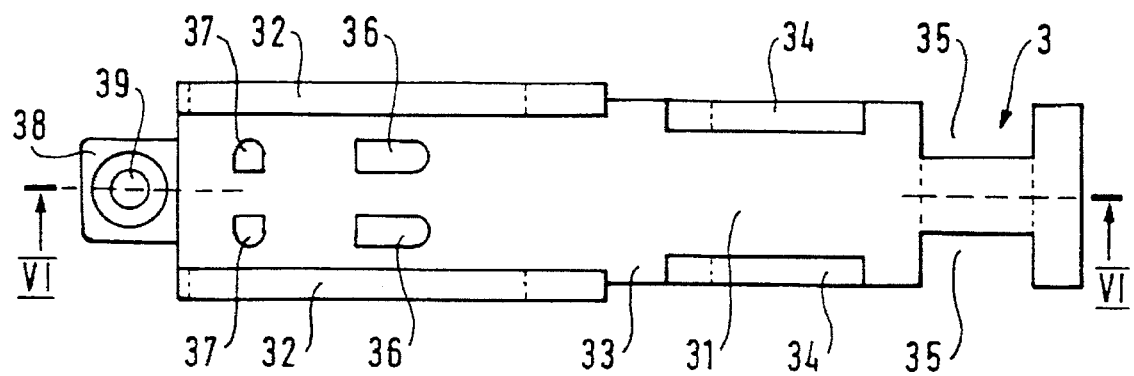
FIG. 5 is a plan view of a removable cable-fastening base-plate for the splice box.
Figure 6:
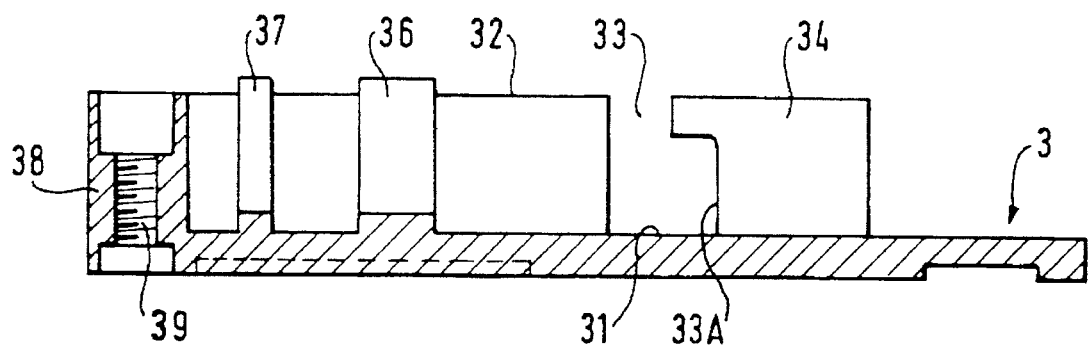
FIG. 6 is a section view through the base-plate on line VI—VI of FIG. 5.

FIGS. 5 and 6 show one of the identical and superposable base-plates 3. In the description of the base-plate, reference is also made to FIG. 2 for the parts mounted on the base-plate for the purposes of holding stationary the cable in the non-stripped state, and of locking the central strength member from the cable.

The base-plate is a channel-section part having a plane web 31 and two opposite side flanges 32. Each flange is provided with a notch 33 which extends over the height of the flange, and is situated substantially half-way along the web, thereby dividing the web into a rear half and a front half. Both flanges are truncated over their heights along the rear portion of the base-plate only.

The rear half of the web is slightly smaller in width that the front half. Accordingly, and excluding the rear end portion of the base-plate, the side flanges along the rear half of the web are set back slightly relative to those along the front half of the web, and they form two side fins 34.

The two side fins 34 are assigned to guiding and holding reinforcing roving from the cable, which roving is received via the notches 33 and is guided through at least one turn around the fins. A recess 33A in the bottom of the rear edge of each notch holds the roving under the resulting projecting top edge of each fin.

The rear end portion of the web is itself provided with two opposite side notches 35 for holding stationary the cable in the non-stripped state on the rear end portion by means of the clamping collar 15 which is received in the two notches. The roving guided rearwards against the outside face of each fin is simultaneously locked under the clamping collar.

The fins 34 and the flanges 32 along the front half are of the same height relative to the web 31.

The cable is stripped beyond the point at which it is held stationary by the clamping collar, and the cable in the stripped state is guided between the two fins. Its released and bare fibers are protected by the two flanges 32 on the front half. Its strength member 11 is stopped and locked near the front end portion of the base-plate in the locking nut 16 mounted on that portion.

A first pair of opposite guide tabs 36 and a second pair of opposite guide tabs 37 are provided one after the other, and parallel to the flanges 32 and to each other. The locking nut 16 is mounted between them and/or is held by a positioning finger between the two tabs in one of the pairs.

The bare fibers are guided between the two pairs of tabs and between the two flanges 32, and through the split foam pad 14 mounted and retained between the two flanges in front of the pair of tabs 37.

The front end of the base-plate forms a single axial end block 38 for fixing the base-plate. The block is secured to the web, and projects upwards and forwards relative thereto. It holds the foam pad between itself and the tabs 37. It is the same height as the flanges 32, and it is provided with a hole 39 extending through its height for receiving the fixing screw 23. The top portion of the hole 39 is larger in diameter than its bottom portion, so that the head of the screw can be received inside the top portion so that it comes into abutment against the bottom of said top portion.

As shown in FIG. 2, in the set 30 of three base-plates 3, the intermediate base-plate rests on one of the side flanges of each of the two end base-plates which rest directly on the support 6 and which are referred to as "bottom" base-plates. Naturally, each of the fastening base-plates may be provided with a single side flange, the side flanges then being disposed on one side on some of the base-plates and on the other side on other base-plates, so that a superposed third base-plate can rest on two bottom base-plates.

Preferably, a spacer block abutting against the support 6 is used for the front end block on the intermediate base-plate superposed on the two bottom base-plates. The spacer block (not shown) is a separate part. It is provided with a through hole extending over its height so that the intermediate base-plate can be fixed via the spacer block onto the support.

In a variant, a base-plate may be superposed on one or each of the two bottom base-plates, both the side flanges of the corresponding bottom base-plate then serving as abutments for the superposed base-plate. The superposed base-plate may optionally project slightly relative to the front of the bottom base-plate.

In practice, the dispositions of the fastening base-plates for cables received via the same accesss are defined by the number of cables that it is possible for the access to receive, which number is itself a function of the cross-sections of the cables.

We claim:

1. A splice box for splicing together optical-fiber cables, the splice box comprising:
   a box body having side accesses for the cables;
   fastening base-plates for removably fastening each one of the cables inside said box body; and
   means for coiling fibers from the cables and for holding splice connections between the fibers,
   wherein the cables are secured to said fastening base-plates before said fastening base-plates are inserted in the accesses and removably fixed inside said box body, and the fibers have free surplus lengths at a front end portion of said fastening base-plates, and
   wherein each one of the accesses to said box body accepts a plurality of cables that are already secured to respective ones of said fastening base-plates, and said fastening base-plates comprise at least one flange for at least partially superposing said fastening base-plates on top of each other inside said box body and facing a common one of the accesses for receiving said plurality of cables.

2. A splice box according to claim 1, wherein said splice box comprises a support, and said support has a set of screw holes in line with each one of the accesses for removably fixing said fastening base-plates.

3. A splice box according to claim 2, wherein said set of screw holes includes at least two screw holes for fixing two fastening base-plates disposed substantially side-by-side on said support.

4. A splice box according to claim 3, wherein said set of screw holes includes a third screw hole between said at least two screw holes for selectively fixing one of a single fastening base-plate on said support, a single fastening base-plate superposed on a lower fastening base-plate, and a third fastening base-plate superposed on two lower fastening base-plates disposed side-by-side.

5. A splice box according to claim 1, including guiding and sealing means for guiding and sealing the cables in the accesses, said guiding and sealing means comprising, for each one of the accesses, at least one rigid ring for guiding the cables through the access, a deformable sealing ring, and an outside clamping nut for clamping said at least one rigid ring and said deformable sealing ring in the access and around each one of the cables.

6. A splice box according to claim 1, wherein said fastening base-plates are elongated members each having a substantially U-shaped cross section over at least a portion of the length of said fastening base-plates.

7. A splice box according to claim 6, wherein said fastening base-plates each comprise a plane web having a first width over a front half and a second width over a rear half, said second width being smaller than said first width, and a front end block that is integral with said web, projects axially therefrom, and includes a screw hole for fixing said base-plate to said box body.

8. A splice box according to claim 7, wherein said fastening base-plates each comprise two flanges on opposite sides of the front half of the fastening base-plate, two side fins on opposite sides of the rear half of the fastening base-plate, and a notch between each fin and each flange.

9. A splice box according to claim 1, further comprising a split foam pad retained on the front end portion of said fastening base-plates for receiving and guiding the free surplus lengths of the fibers.

10. A splice box for splicing together optical-fiber cables, the splice box comprising:

a box body having side accesses for the cables;

fastening base-plates for removably fastening each one of the cables inside said box body; and means for coiling fibers from the cables and for holding splice connections between the fibers, wherein the cables are secured to said fastening base-plates before said fastening base-plates are inserted in the accesses and removably fixed inside said box body, and the fibers have free surplus lengths at a front end portion of said fastening base-plates, and wherein each one of the accesses to said box body accepts a plurality of cables that are already secured to respective ones of said fastening base-plates, and said fastening base-plates comprise at least one flange for at least partially superposing other ones of said fastening base-plates on top of each other inside said box body and facing a common one of the accesses for receiving said plurality of cables, wherein said fastening base-plates each comprise a plane web having a first width over a front half and a second width over a rear half, said second width being smaller than said first width, and a front end block that is integral with said web, projects axially therefrom, and includes a screw hole for fixing said base-plate to said box body.

11. A splice box according to claim 10, wherein said fastening base-plates each comprise two flanges on opposite sides of the front half of the fastening base-plate, two side fins on opposite sides of the rear half of the fastening base-plate, and a notch between each fin and each flange.

* * * * *